UNITED STATES PATENT OFFICE.

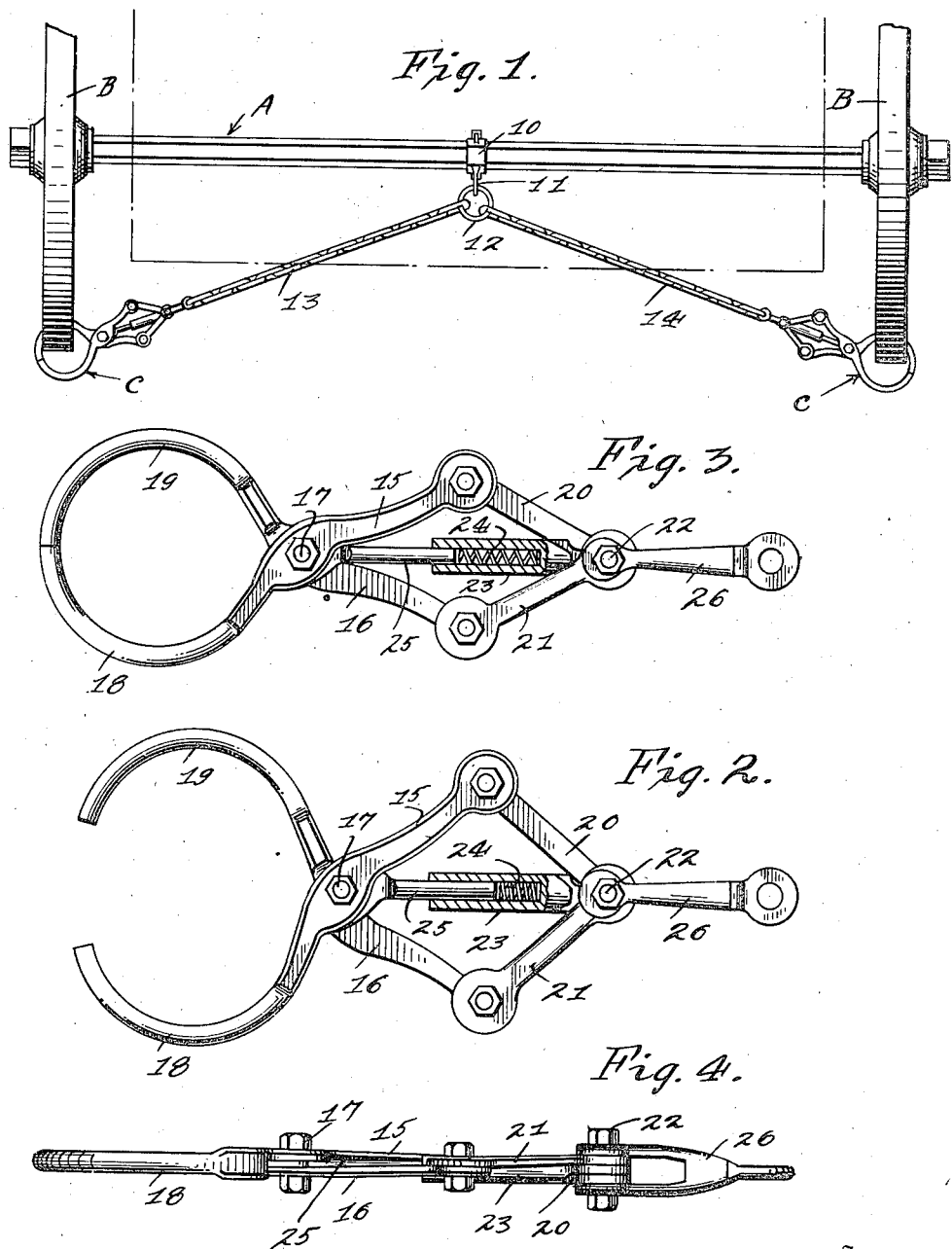

CHARLES B. STEVENS, OF NEW YORK, N. Y.

COUPLING DEVICE FOR BRAKE-CHAINS.

1,172,915.  Specification of Letters Patent.  Patented Feb. 22, 1916.

Application filed August 11, 1915. Serial No. 44,985.

*To all whom it may concern:*

Be it known that I, CHARLES B. STEVENS, a citizen of the United States, residing at New York city, in the county of New York, State of New York, have invented certain new and useful Improvements in Coupling Devices for Brake-Chains; and I do hereby declare the following to be a full, clear, and exact description of the invention, such as will enable others skilled in the art to which it appertains to make and use the same.

This invention relates to coupling devices for brake chains.

The object of the invention is to provide a coupling device of the type named whereby the chain may be easily secured to the rim of a wheel of a wagon to hold the wheel against rotation, said coupling device being so constructed that the coupling tendency thereof is enhanced as the draft on the coupling chain increases.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the rear axle of a wagon showing a braking chain embodying the coupling operatively applied to secure the wheels against rotation; Fig. 2, an elevation of the coupling partly in section, the parts of same being in uncoupling position; Fig. 3, a view similar to Fig. 2 with the parts in coupling position; and Fig. 4, a side view of the coupling.

Referring to the drawings A indicates the rear axle of a wagon on which are rotatably mounted traction wheels B. Secured to the axle A is a clip 10 having an eye 11 in which is engaged a ring 12. Secured to this ring are chains 13 and 14 and secured to the free ends of these chains respectively are couplings C which are adapted to be secured to the wheels B to hold the latter against rotation. Each coupling C comprises arms 15 and 16 pivotally connected by means of a bolt 17. Corresponding ends of said arms are curved outwardly and inwardly as at 18 and 19 respectively, the free ends of the curved portions 18 and 19 being adapted to abut when said curved portions are moved to their limit toward each other. The ends of the arms 15 and 16 remote from the curved portions 18 and 19 have pivotally connected thereto respectively links 20 and 21. The ends of the links 20 and 21 remote from the arms 15 and 16 are pivotally connected by a bolt 22. Also pivoted upon this bolt 22 is a cylinder 23 in which is disposed a spring 24. Pivoted upon the bolt 17 is a piston 25 which is slidably engaged in the cylinder 23. Also pivotally mounted on the bolt 22 is a shackle 26 to which is secured one of the brake chains.

The action of the spring 24 is such that the piston 25 is normally forced out of the cylinder 23 to hold the free ends of the curved portions 18 and 19 in abutting relation. It will also be obvious that when the curved portions are engaged around the rim of a wheel B and said wheel tends to rotate it will serve to draw the free ends of the curved portions in abutting relation. In other words the greater the rotative force of the wheels the tighter the couplings will hold.

The couplings are to be made out of the best steel and when such material is used they can be constructed relatively light and yet possess the requisite strength.

What is claimed is:—

1. A coupling for brake chains comprising pivotally connected members having corresponding ends curved outwardly and inwardly and adapted to embrace the rim of a wheel, links pivotally connected to the ends of the members respectively remote from the curved end, a bolt pivotally connecting the remaining ends of said links, a cylinder pivoted on the bolt, a piston mounted on the pivotal connection between the members and slidable in the cylinder, and a shackle secured to the bolt connecting the links.

2. A coupling for brake chains comprising pivotally connected members having corresponding ends curved outwardly and inwardly and adapted to embrace the rim of a wheel, links pivotally connected to the ends of the members respectively remote from the curved ends, a bolt pivotally connecting the remaining ends of said link, a cylinder pivoted on the bolt, a piston mounted on the pivotal connection between the members and slidable in the cylinder, a spring interposed between the piston and the inner end of the cylinder, and a shackle secured to the bolt connecting the links.

In testimony whereof, I affix my signature, in the presence of two witnesses.

CHARLES B. STEVENS.

Witnesses:
   H. S. Dirrer,
   J. W. Pione.